(12) United States Patent
Wingert et al.

(10) Patent No.: US 6,708,708 B2
(45) Date of Patent: Mar. 23, 2004

(54) PNEUMATIC ACTUATION CONTROL SYSTEM AND METHOD OF OPERATION

(75) Inventors: David A. Wingert, Fountain Hills, AZ (US); Daniel S. Winkler, Mesa, AZ (US)

(73) Assignee: The Boeing Company, Seattle, WA (US)

( * ) Notice: Subject to any disclaimer, the term of this patent is extended or adjusted under 35 U.S.C. 154(b) by 50 days.

(21) Appl. No.: 10/205,076

(22) Filed: Jul. 25, 2002

(65) Prior Publication Data

US 2004/0016465 A1 Jan. 29, 2004

(51) Int. Cl.$^7$ ............................................. G05D 16/20
(52) U.S. Cl. .................... 137/12; 137/81.1; 137/596.17
(58) Field of Search ...................... 137/12, 81.1, 596.17

(56) References Cited

U.S. PATENT DOCUMENTS

| | | | | |
|---|---|---|---|---|
| 3,994,314 A | * | 11/1976 | Hartley | 137/596.17 |
| 4,182,368 A | * | 1/1980 | Hartley | 137/596.17 |
| 4,836,234 A | * | 6/1989 | Hicks | 137/596.17 |
| 5,540,268 A | | 7/1996 | Mittal | |
| 5,665,143 A | | 9/1997 | Jarvis et al. | |
| 5,718,669 A | | 2/1998 | Marble | |
| 5,989,315 A | | 11/1999 | Stuart et al. | |

OTHER PUBLICATIONS

Tescom Corporation—Electronic Controls Division; *ER300 Electronic Pressure Controller—User Manual*; Sep. 2000; 61 pages; Tescom Corporation, Elk River, Minnesota.

* cited by examiner

*Primary Examiner*—Gerald A. Michalsky
(74) *Attorney, Agent, or Firm*—Alston & Bird LLP

(57) ABSTRACT

A pneumatic actuation control system includes a pressure controller, an eductor and a valve. The pressure controller is capable of directing an amount of fluid to the contained volume such that a pressure within the contained volume exceeds a pressure external to the contained volume by a predefined positive pressure. The pressure controller can also adjust the pressure within the contained volume when the pressure external to the contained volume changes. The eductor can draw fluid from the contained volume to thereby decrease the pressure within the contained volume. The valve is controllably operable in either a pressure mode or a vacuum mode, where the valve either permits the pressure controller to provide fluid to the contained volume, or permits the eductor to draw fluid from the contained volume. As such, the system provides precision pressure control over a broad range of external pressures while compensating for rapid pressure changes.

16 Claims, 2 Drawing Sheets

PNEUMATIC ACTUATION CONTROL SYSTEM AND METHOD OF OPERATION

FIELD OF THE INVENTION

The present invention relates generally to pneumatic actuation control systems and methods and, more particularly, relates to systems and methods of pneumatically actuating a pressurizable object having a contained volume utilizing both a positive pressure and a negative pressure to provide fluid to, and draw fluid from, the contained volume.

BACKGROUND OF THE INVENTION

Pneumatically actuated switching assemblies are commonly used in many industries, including the aircraft industry, to control pressurizable objects that include a contained volume. In this regard, where the pressurizable objects comprise mechanical displacement devices, such as inflatable bladders, pneumatically actuated switching assemblies generally include inflation-actuated switching assemblies and vacuum-actuated switching assemblies. An inflation-actuated switching assembly controls pressure within a contained volume by providing fluid, such as air, to the contained volume at a pressure greater than the pressure of fluid external to the contained volume. As such, the inflation-actuated switching assembly is capable of positively displacing, or inflating, the mechanical displacement device. In contrast, a vacuum-actuated switching assembly draws fluid from the contained volume by applying negative pressure (i.e., vacuum) to fluid within the contained volume. Thus, the vacuum-actuated switching assembly is capable of negatively displacing, or deflating, the mechanical displacement device.

Whereas inflation-actuated or vacuum-actuated switching assemblies are generally adequate for many applications, such switching assemblies have drawbacks. In particular, inflation-actuated and vacuum-actuated switching assemblies are generally designed for a single external pressure, such as sea level static atmospheric pressure. As such, in applications such as in aircraft, missiles and spacecraft that typically operate at multiple altitudes and, thus multiple atmospheric pressures, conventional inflation-actuated and vacuum-actuated switching assemblies do not continuously function properly across the range of encountered external pressures. In this regard, conventional inflation-actuated and vacuum-actuated switching assemblies cannot compensate for changes in altitude and, thus, changes in atmospheric pressure. Additionally, the rate of change in pressure can be very rapid for high performance platforms that climb and descend quickly.

SUMMARY OF THE INVENTION

In light of the foregoing background, embodiments of the present invention provide an improved pneumatic actuation control system and method for controlling a pressurizable object that defines a contained volume. Advantageously, the system and method of the present invention utilize both positive and negative pressure to control the pressurizable object and, additionally, compensate for changes in pressure external to the contained volume. Thus, the system and method can be used in applications that necessarily include changes in external pressure, such as changes in atmospheric pressure caused by increasing or decreasing the altitude of the pressurizable object. Also, the system and method of the present invention is capable of controlling the pressurizable object based upon highly sensitive measurements of pressure within, and external to, the pressurizable object. As such, the system and method of the present invention provide precision control of the pressurizable object that allows the system and method to operate in environments where the pressurizable object may encounter rapid changes in external pressure, such as changes due to rapid altitude changes.

According to one embodiment, a pneumatic actuation control system includes a pressure controller, an eductor and a valve. The pressure controller is capable of directing fluid flow, such as from a fluid source. In this regard, the pressure controller is capable of directing an amount of fluid to the contained volume such that a pressure of fluid within the contained volume exceeds a pressure of fluid external to the contained volume by a predefined positive pressure, such as a pressure approximately equal to or not exceeding 0.1 psi. The pressure controller is also capable of adjusting the pressure of fluid within the contained volume, such as by either providing additional fluid to the contained volume or drawing fluid from the contained volume, when the pressure external to the contained volume changes. As such, the pressure controller can be capable of measuring a pressure of fluid within the contained volume relative to a pressure of fluid external to the contained volume.

The eductor, on the other hand, is capable of drawing fluid from within the contained volume to thereby decrease the pressure of fluid within the contained volume. The valve, which is in fluid communication with the pressure controller, the eductor and the pressurizable object, is controllably operable in either a pressure mode or a vacuum mode. In pressure mode, the valve permits the pressure controller to either direct an amount of fluid to the contained volume or adjust the pressure within the contained volume. In vacuum mode, the valve permits the eductor to draw fluid from the contained volume. To control operation of the valve and, thus, the flow of fluid into and out of the contained volume, the system can also include a valve control switch capable of controlling operation of the valve.

According to the present invention, the pressure controller is capable of adjusting the fluid provided to the contained volume when the pressure of fluid external to the contained volume changes. In this regard, the pressure controller can be capable of repeatedly measuring the pressure of fluid within the contained volume relative to a pressure of fluid external to the contained volume. Thus, when the pressure of fluid external to the contained volume increases, the pressure controller is capable of providing additional fluid to the contained volume to thereby increase the pressure of fluid within the contained volume. For example, when the pressure of fluid external to the contained volume increases by an amount, the pressure controller is capable of providing additional fluid to the contained volume to thereby increase the pressure of fluid within the contained volume by the same amount. In contrast, when the pressure of fluid external to the contained volume decreases, the pressure controller is capable of drawing an amount of fluid from the contained volume to thereby decrease the pressure of fluid within the contained volume. Thus, for example, when the pressure of fluid external to the contained volume decreases by an amount said pressure controller is capable of drawing an amount of fluid from the contained volume to thereby decrease the pressure of fluid within the contained volume by the same amount.

In embodiments including a fluid source, the system can include a pressure regulator capable of regulating a pressure of fluid from the fluid source. In this regard, the pressure regulator is disposed between the fluid source and the pressure controller and in fluid communication with the fluid source and the pressure controller. Also, the pressure regulator is disposed between the fluid source and the eductor and in fluid communication with the fluid source and the eductor. A method of pneumatically actuating a pressurizable object that defines a contained volume is also provided.

BRIEF DESCRIPTION OF THE DRAWINGS

Figure 1:
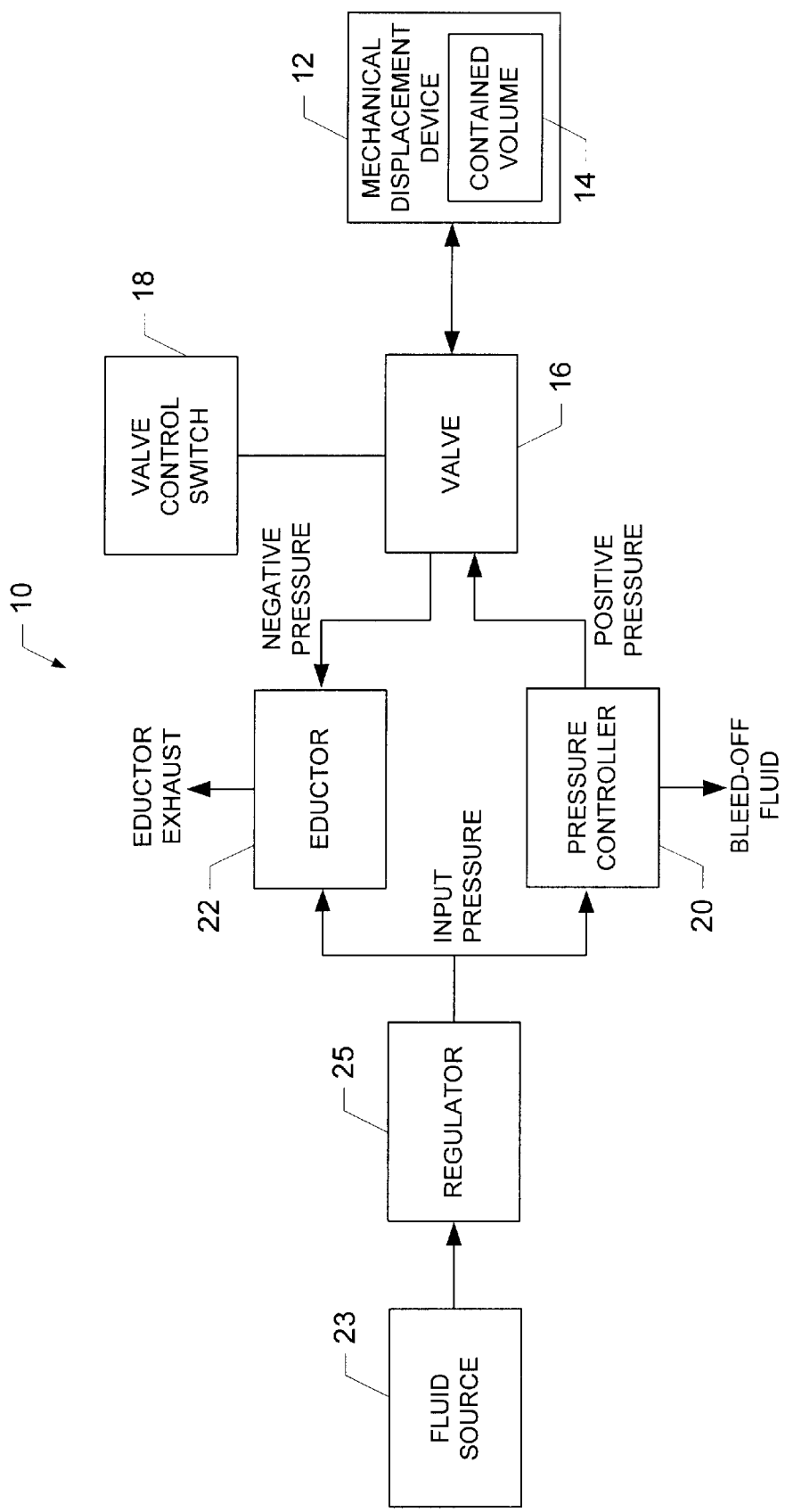
Figure 2:
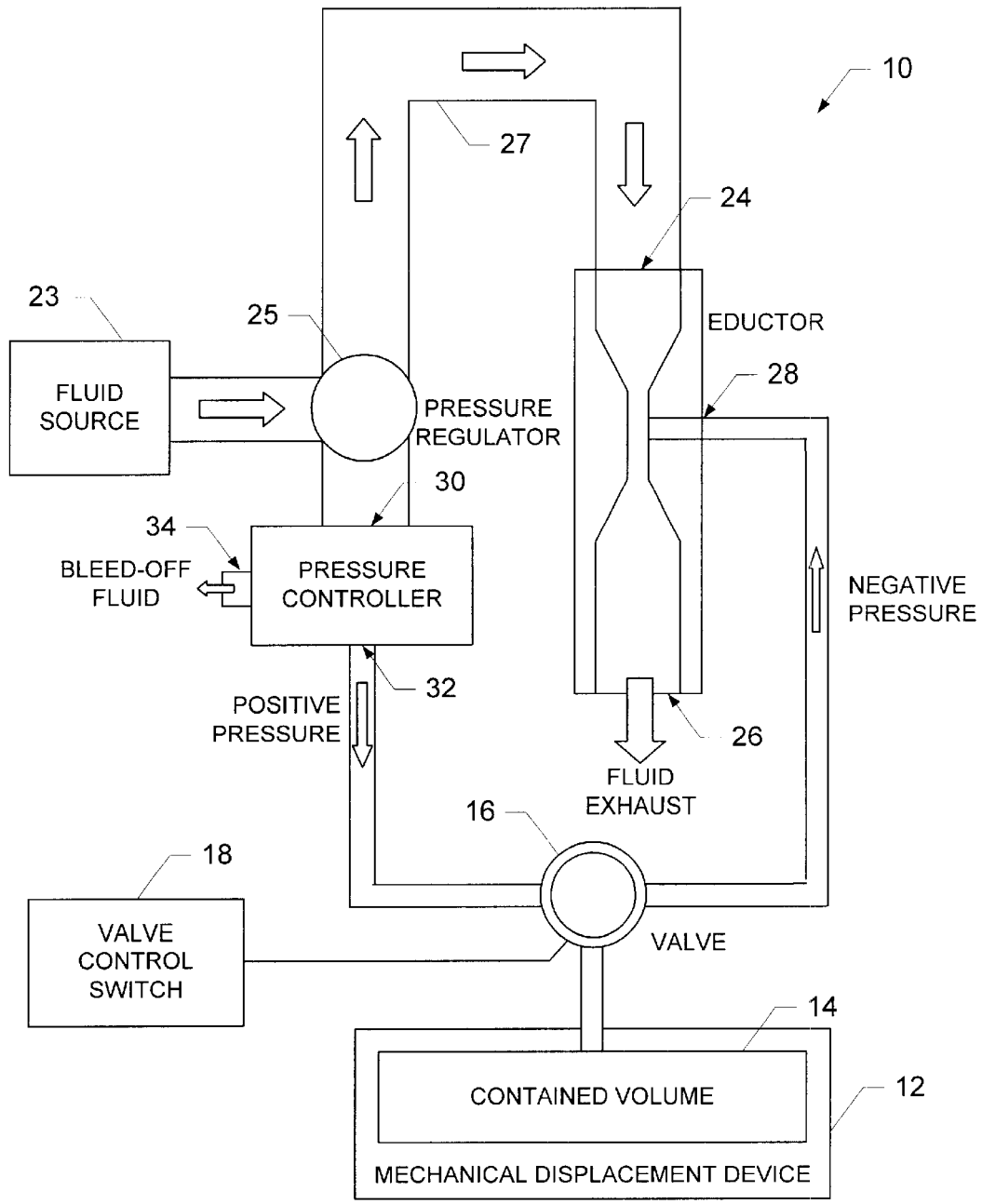

Having thus described the invention in general terms, reference will now be made to the accompanying drawings, which are not necessarily drawn to scale, and wherein:

FIG. 1 is a block diagram of a pneumatic actuation control system according to one embodiment of the present invention; and FIG. 2 is a schematic block diagram of the pneumatic actuation control system according to one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

A pneumatic actuation control system is provided for controlling a pressurizable object that includes a contained volume. The pneumatic actuation control system can have any one of a number of different applications and, as such, the pressurizable object can comprise any of a number of different devices. For example, as used in the aircraft industry to control electrical contacts, the pressurizable object could comprise a thin, inflatable bag. Also, using the pneumatic actuation control system in the medical industry with pressure swing or membrane technology to provide a self-contained gas supply, the pressurizable object could comprise a pneumatic leg cuff to control peripheral edema. Additionally, using the pneumatic actuation control system in the medical industry with a pneumatic splint, the pressurizable object could comprise an annular bag. It will be appreciated that, as used in many applications, the pressurizable object comprises a mechanical displacement device, such as an inflatable bladder. As such, the pressurizable object will be described below as a mechanical displacement device capable of being inflated and deflated. It should be understood, however, that the pressurizable object can comprise any number of different devices having a contained volume without departing from the spirit and scope of the present invention.

Referring to FIGS. 1 and 2, the pneumatic actuation control system 10 generally includes a valve 16 in fluid communication with the contained volume 14 of a mechanical displacement device 12. The valve can comprise any one of a number of different controllably operable switching valves and, in one embodiment, the valve comprises a R16-02-G00A model valve manufactured by Sirai Elettromeccanica Srl of Bussero, Italy. The valve can controllably operate in either a pressure mode or a vacuum mode. In pressure mode, the valve permits an amount of fluid to be directed to the contained volume to inflate the mechanical displacement device. In this regard, the contained volume receives fluid such that the pressure of fluid within the contained volume is greater than the pressure of fluid external to the contained volume (e.g., atmospheric pressure). Also, in pressure mode the valve can permit the pressure of fluid within the contained volume to be adjusted when the pressure of fluid external to the contained volume changes. In contrast, in vacuum mode the valve permits fluid to be drawn from the contained volume to thereby deflate the mechanical displacement device. Thus, in vacuum mode, fluid is drawn from the contained volume such that the pressure of fluid within the contained volume decreases. It will be appreciated that, as used herein, fluid can comprise a gaseous substance, liquid substance or a combination thereof.

To control operation of the valve 16 and, thus, the flow of fluid into and out of the contained volume 14 of the mechanical displacement device 12, the system 10 can include a valve control switch 18. The valve control switch can comprise any of a number of different known switches capable of switching the valve from the pressure mode to the vacuum mode and vice versa. For example, the valve control switch can comprise any single-pole single-throw switch.

To direct fluid to the contained volume 14 and/or adjust the pressure of fluid within the contained volume in when the valve 16 is in pressure mode, the system 10 includes a pressure controller 20. And to draw fluid from the contained volume when the valve operates in vacuum mode, the system includes an eductor 22 (sometimes referred to as a venturi). In this regard, both the pressure controller and the eductor are in fluid communication with the valve. As used herein, any elements in fluid communication can be interconnected according to any one of a number of different manners. For example, the elements can be mechanically connected to opposite ends of tubing 27, pipe or the like. To provide fluid directed by the pressure controller and the fluid provided to the eductor, the system can include a fluid source 23. The fluid source can comprise any of a number of devices capable of providing fluid at a pressure sufficient to operate the system according to the present invention. For example, as used in the aircraft industry, fluid source can include host platform environmental control system (ECS) air capable of providing fluid comprising engine bleed air, or a RAM air duct capable of providing air from an external (free air) inlet.

It will be appreciated that, in some applications, fluid source 23 is capable of providing fluid at an excess pressure. As shown, then, the system can include a pressure regulator 25 disposed at an output of fluid source between fluid source and the eductor 22 and the pressure controller 20, where the pressure regulator is in fluid communication with fluid source, the eductor and the pressure controller. The pressure regulator can regulate the pressure of fluid from the fluid source, such as in a step-down manner, so as to provide the fluid directed by the pressure controller and the fluid to the eductor at an input pressure that does not exceed a pressure at which the eductor is capable of operating efficiently. For example, the pressure regulator can regulate (e.g., reduce) the pressure of fluid from the fluid source, which can be anywhere from 100 to 250 pounds per square inch (psi), to between 60 psi and 80 psi where the educator 22 operates efficiently.

The eductor 22 can comprise any of a number of known eductors such as, for example, any number of air powered vacuum pumps available from Thomas Industries, Inc. of Sheboygan, Wis. As is known, the eductor is capable of receiving fluid at a fluid inlet 24 disposed at one end of the eductor. As fluid passes through the eductor from fluid inlet to an exhaust outlet 26, the shape of the eductor causes the speed of fluid to increase, which generates a negative pressure at a medial inlet 28 on the eductor. In this regard, the medial inlet is in fluid communication with the valve 16 and, when the valve operates in the vacuum mode, the contained volume 14 of the mechanical displacement device 12. As such, when the valve operates in vacuum mode, the negative pressure generated in the eductor is capable of drawing fluid from the contained volume, where fluid proceeds through the medial inlet of the eductor and out the outlet.

The pressure controller 20 can comprise any of a number of different controllers capable of performing the functions as described herein such as, for example, a model ER3218 Electronic Pressure Controller manufactured by Tescom Corporation of Elk River, Minn. The pressure controller can direct fluid flow in any one of a number of different manners but, according to one embodiment, the pressure controller directs the flow of fluid by receiving the fluid and thereafter directing the fluid to the contained volume 14 or out of the system. In this embodiment, the pressure controller is capable of receiving fluid through an input port 30 and, when the valve 16 is operating in the pressure mode, providing at least a portion of fluid through an output port 32 to the contained volume 14 of the mechanical displacement device 12. In this regard, the pressure controller can provide fluid to the contained volume such that the pressure of fluid within the contained volume exceeds the pressure external to the contained volume (e.g., atmospheric pressure) by a predefined positive pressure. Advantageously, the pressure controller can control fluid to the contained volume such that the predefined positive pressure is small, such as at or below 0.1 psi.

To determine the amount of fluid provided to the contained volume 14, the pressure controller 20 includes a sensor (not shown) capable of measuring a pressure of fluid within the contained volume relative to a pressure of fluid external to the contained volume, sometimes referred to as differential pressure. As the pressure controller can control fluid to the contained volume such that the predefined positive pressure is small, the sensor is preferably a highly sensitive sensor capable of measuring the relative pressure of fluid within the contained volume to within 0.1 psi or lower. It will be appreciated that, if the pressure of fluid external to the contained volume comprises atmospheric pressure, the sensor is capable of measuring the vented gauge pressure of fluid within the contained volume, as such is known. It will also be appreciated that the pressure controller can include can include two sensors, each capable of measuring a respective pressure in a manner such that the pressure of fluid within the contained volume can be determined relative to the pressure of fluid external to the contained volume. For example, the sensors can measure absolute pressure or sealed gauge pressure of fluid external to, and within, the contained volume.

Regardless of how the sensor(s) measure the pressure of fluid within the contained volume 14 relative to the pressure of fluid external to the contained volume, once the pressure controller 20 has the differential pressure of fluid within the contained volume the pressure controller can determine the amount of fluid to provide to the contained volume. In this regard, if the differential pressure of fluid within the contained volume differs from the predefined positive pressure, the pressure controller can provide fluid to the contained volume to thereby adjust the differential pressure to approximately equal the predefined differential pressure.

Preferably, the predefined positive pressure remains as close to constant as possible throughout operation of the system 10 and, as such, the pressure controller 20 is capable of dynamically adjusting the amount of fluid provided to the contained volume 14 based upon changes in the pressure of fluid within the contained volume and/or the pressure of fluid external to the contained volume, such as in changes in altitude of the mechanical displacement device. The pressure controller is preferably adapted to adjust the amount of fluid provided to the contained volume at a rate as close as possible to the rate of change of the pressure external to the contained volume. Advantageously, as the sensor is capable of providing highly sensitive measurements of the relative pressure of fluid within the contained volume, the pressure controller can adjust the amount of fluid provided to the contained volume with high precision. As such, the system is uniquely adapted for environments that experience rapid changes in the relative pressure. More particularly, the system is adapted for environments that experience rapid changes in pressure external to the contained volume, such as rapid changes in external pressure due to rapid changes in the altitude of the mechanical displacement device 12.

The pressure controller can adjust the amount of fluid provided to the contained volume and, thus, the pressure of fluid within the contained volume, in any one of a number of different manners. According to one embodiment, for example, the pressure controller can increase the pressure of fluid within the contained volume by providing an additional amount of fluid to the contained volume. In contrast, the pressure controller can decrease the pressure of fluid within the contained volume by drawing an amount of fluid, or bleed off an amount of fluid, from the contained volume and exhausting this "bleed-off" fluid from the system through an exhaust port 34 of the pressure controller. Therefore, to adjust the amount of fluid provided to the contained volume, the controller can either provide additional fluid to the contained volume or bleed off fluid from the contained volume.

To dynamically adjust the amount of fluid provided to the contained volume 14 based upon the changes in pressure within the contained volume and/or external to the contained volume, the sensor(s) of the pressure controller 20 is capable of repeatedly measuring the pressure of fluid within the contained volume relative to the pressure of fluid external to the contained volume. And when the pressure of fluid external to the contained volume increases by a predetermined amount, the pressure controller is capable of increasing the amount of fluid provided to the contained volume to thereby increase the pressure within the contained volume by the predetermined amount to offset the increase in external pressure. Likewise, when the pressure of fluid external to the contained volume decreases by a predetermined amount, the pressure controller is capable of decreasing the amount of fluid provided to the contained volume to thereby decrease the pressure within the contained volume by the predetermined amount to offset the decrease in external pressure.

For example, consider the following scenario where the pressure external to the contained volume 14 comprises atmospheric pressure: initially, the pressure external to the contained volume PE(t) equals the pressure within the contained volume PI(t), and both pressures equal the atmospheric pressure at sea level. Thus, at time t=0, PE(0)=PI(0)=14.7 psi. Setting the predefined positive pressure to 0.1 psi at time t=1, the pressure controller 20 provides fluid to the contained volume such that the pressure within the contained volume PI(1) exceeds the pressure external to the contained volume PE(1) by 0.1, or PI(1)=14.8 psi. Now, presume the atmospheric pressure decreases by 2 psi to 12.7 psi, such as by increasing the altitude of the mechanical displacement device 12. The pressure controller responds to the decrease in external pressure by decreasing the pressure within the contained volume 2 psi to 12.8 psi. Similarly, presume the atmospheric pressure increases by 2 psi to 16.7 psi, such as by decreasing the altitude of the mechanical displacement device below sea level. In such an instance, the pressure controller responds to the increase in external pressure by increasing the pressure within the contained volume 2 psi to 16.8 psi. As shown, then, the pressure controller can control fluid applied to the contained volume to maintain the predefined positive pressure at 0.1 psi.

The pressure controller 20 and eductor 22 have been described as being capable of providing fluid to, and drawing fluid from, the contained volume 14 of the mechanical displacement device 12. It should be noted, however, that operation of the pressure controller and eductor as it pertains to the contained volume depends upon the mode of operation of the valve 16. Whereas the pressure controller is preferably capable of receiving fluid regardless of the mode of the valve, the pressure controller is only capable of providing fluid to the contained volume when the valve operates in the pressure mode. Likewise, even though the eductor is preferably capable of receiving fluid independent of the mode of the valve, the eductor can only draw fluid from the contained volume when the valve operates in the vacuum mode.

By controlling operation of the valve 16 and, thus, the flow of fluid into, and out of, the contained volume 14 of the mechanical displacement device 12, such as via the valve control switch 18, a user of the system can controllably apply fluid to the contained volume to thereby inflate the mechanical displacement device. Likewise, the user can controllably draw fluid from the contained volume to thereby deflate the mechanical displacement device. In this regard, the pressure controller and eductor can be adapted to provide pressure to and draw pressure from the contained volume, respectively, at any one of a number of different rates, as desired. Advantageously, when the valve is operating in the pressure mode, the pressure controller can adjust fluid provided to the contained volume to thereby maintain a constant difference in pressure of fluid within the contained volume and fluid external to the contained volume.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A pneumatic actuation control system for controlling a pressurizable object that defines a contained volume, said system comprising:

a pressure controller capable of directing fluid flow, wherein said pressure controller is capable of directing an amount of fluid to the contained volume such that a pressure of fluid within the contained volume exceeds a pressure of fluid external to the contained volume by a predefined positive pressure, wherein said pressure controller is further capable of adjusting the pressure of fluid within the contained volume, and wherein said pressure controller is capable of adjusting the pressure by at least one of providing additional fluid to the contained volume and drawing an amount of fluid from the contained volume when the pressure external to the contained volume changes;

an eductor capable of drawing fluid from within the contained volume to thereby decrease the pressure of fluid within the contained volume; and a valve in fluid communication with said pressure controller, said eductor and the pressurizable object, wherein said valve is controllably operable in at least one of a pressure mode and a vacuum mode, wherein when said valve operates in the pressure mode said valve permits said pressure controller to at least one of directing an amount of fluid to the contained volume and adjusting the pressure of fluid within the contained volume, and wherein when said valve operates in the vacuum mode said valve permits said eductor to draw fluid from the contained volume.

2. A pneumatic actuation control system according to claim 1, wherein when the pressure of fluid external to the contained volume increases said pressure controller is capable of adjusting the pressure of fluid within the contained volume by providing additional fluid to the contained volume, and wherein when the pressure of fluid external to the contained volume decreases said pressure controller is capable of adjusting the pressure of fluid within the contained volume by drawing an amount of fluid from the contained volume.

3. A pneumatic actuation control system according to claim 1 further comprising a fluid source in fluid communication with said pressure controller and said eductor, wherein said fluid source is capable of providing the fluid directed by said pressure controller.

4. A pneumatic actuation control system according to claim 3, wherein said fluid source is further capable of providing fluid to said eductor, and wherein said eductor is capable of receiving fluid and thereafter drawing fluid from the contained volume based upon fluid received from said fluid source.

5. A pneumatic actuation control system according to claim 4 further comprising a pressure regulator disposed between said fluid source and said pressure controller and in fluid communication with said fluid source and said pressure controller, wherein said pressure regulator is also disposed between said fluid source and said eductor and in fluid communication with said fluid source and said eductor, and wherein said pressure regulator is capable of regulating a pressure of fluid from said fluid source.

6. A pneumatic actuation control system according to claim 1, wherein said pressure controller is capable of measuring a pressure differential between the pressure of fluid within the contained volume and the pressure of fluid external to the contained volume.

7. A pneumatic actuation control system according to claim 6, wherein said pressure controller is capable of repeatedly measuring the differential pressure, wherein when the pressure of fluid external to the contained volume increases by an amount said pressure controller is capable of adjusting the pressure of fluid within the contained volume by providing additional fluid to the contained volume to thereby increase the pressure of fluid within the contained volume by the same amount, and wherein when the pressure of fluid external to the contained volume decreases by an amount said pressure controller is capable of drawing an amount of fluid from the contained volume to thereby decrease the pressure of fluid within the contained volume by the same amount.

8. A pneumatic actuation control system according to claim 1 further comprising a valve control switch capable of controlling operation of said valve.

9. A pneumatic actuation control system according to claim 1, wherein said pressure controller is capable of directing an amount of fluid to the contained volume such that the pressure of fluid within the contained volume exceeds the pressure of fluid external to the contained volume by no more than 0.1 psi.

10. A pneumatic actuation control system according to claim 1, wherein said pressure controller is capable of directing an amount of fluid to the contained volume such that the pressure of fluid within the contained volume exceeds the pressure of fluid external to the contained volume by 0.1 psi.

11. A pneumatic actuation control system according to claim 1, wherein the pressurizable object is at an altitude and the pressure of fluid external to the contained volume comprises atmospheric pressure at the altitude, wherein when the altitude of the pressurizable object changes to thereby change the atmospheric pressure said pressure controller is capable of adjusting the pressure of fluid within the contained volume based upon the change in atmospheric pressure.

12. A method of pneumatically actuating a pressurizable object that defines a contained volume, said method comprising:

determining a pressure differential between a pressure within the contained volume and a pressure external to the contained volume;

directing an amount of fluid to the contained volume such that the pressure within the contained volume exceeds the pressure external to the contained volume by a predefined positive pressure;

adjusting the pressure of fluid within the contained volume, wherein adjusting the pressure comprises at least one of providing additional fluid to the contained volume and drawing an amount of fluid from the contained volume when the pressure external to the contained volume changes; and drawing fluid from the contained volume thereby decreasing the pressure of fluid within the contained volume.

13. A method according to claim 12, wherein the pressurizable object is at an altitude and the pressure external to the contained volume comprises atmospheric pressure at the altitude, said method further comprising altering the altitude of the pressurizable object to thereby alter the atmospheric pressure, wherein altering the altitude occurs after directing an amount of fluid to the contained volume.

14. A method according to claim 12, wherein the pressure external to the contained volume increases adjusting the pressure within the contained volume comprises providing additional fluid to the contained volume to thereby increase the pressure of fluid within the contained volume, and wherein when the pressure external to the contained volume decreases adjusting the pressure within the contained volume comprises drawing fluid from the contained volume to thereby decrease the pressure of fluid within the contained volume.

15. A method according to claim 12, wherein directing an amount of fluid to the contained volume comprises directing an amount of fluid to the contained volume such that the pressure within the contained volume exceeds the pressure external to the contained volume by no more than 0.1 psi.

16. A method according to claim 12, directing an amount of fluid to the contained volume comprises directing an amount of fluid to the contained volume such that the pressure within the contained volume exceeds the pressure external to the contained volume by 0.1 psi.

* * * * *